May 9, 1939.  R. R. ROOT  2,157,630

DUSTING MACHINE

Filed May 18, 1935  4 Sheets-Sheet 1

INVENTOR
RALPH R. ROOT
Kwis Hudson + Kent
attys.

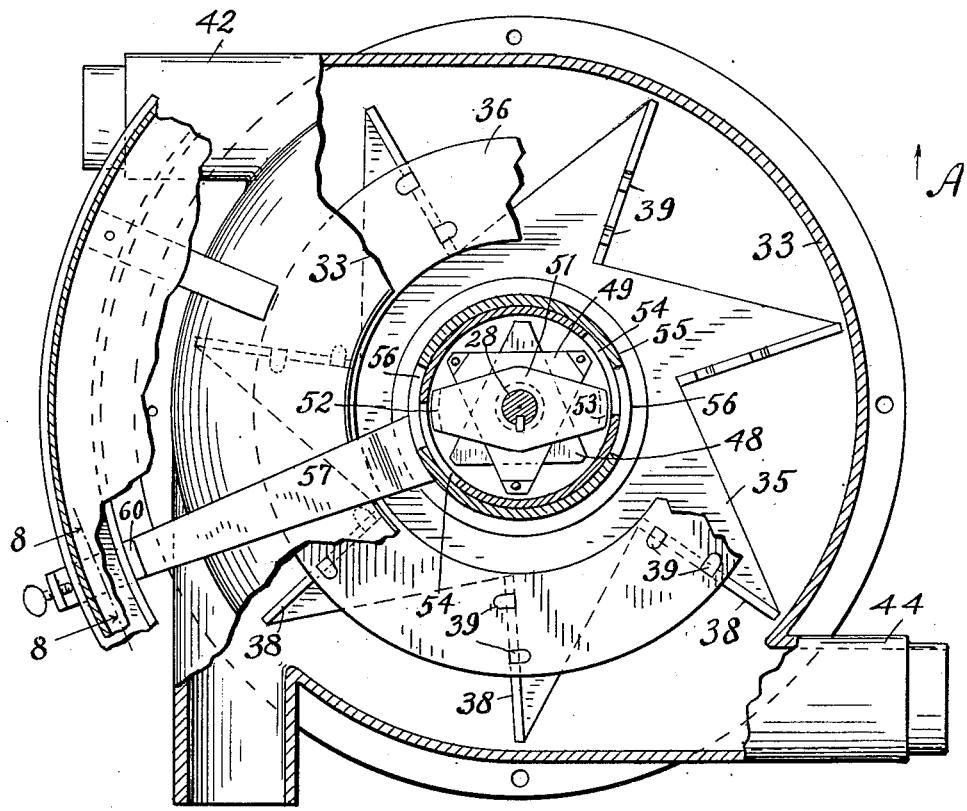
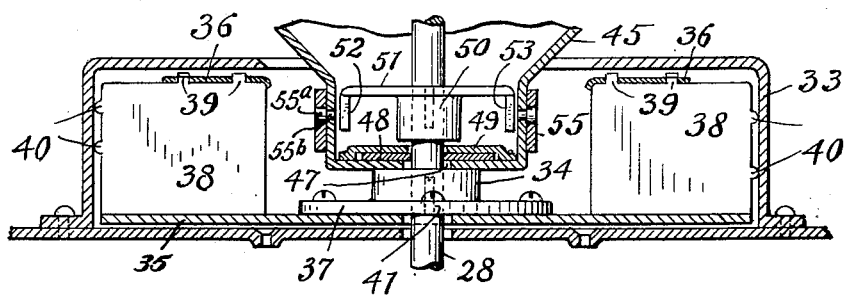
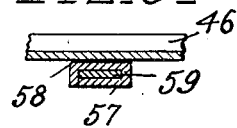

May 9, 1939.  R. R. ROOT  2,157,630
DUSTING MACHINE
Filed May 18, 1935   4 Sheets-Sheet 3

INVENTOR.
RALPH R. ROOT
BY
Kwis, Hudson & Kent
ATTORNEYS.

May 9, 1939.  R. R. ROOT  2,157,630
DUSTING MACHINE
Filed May 18, 1935  4 Sheets-Sheet 4
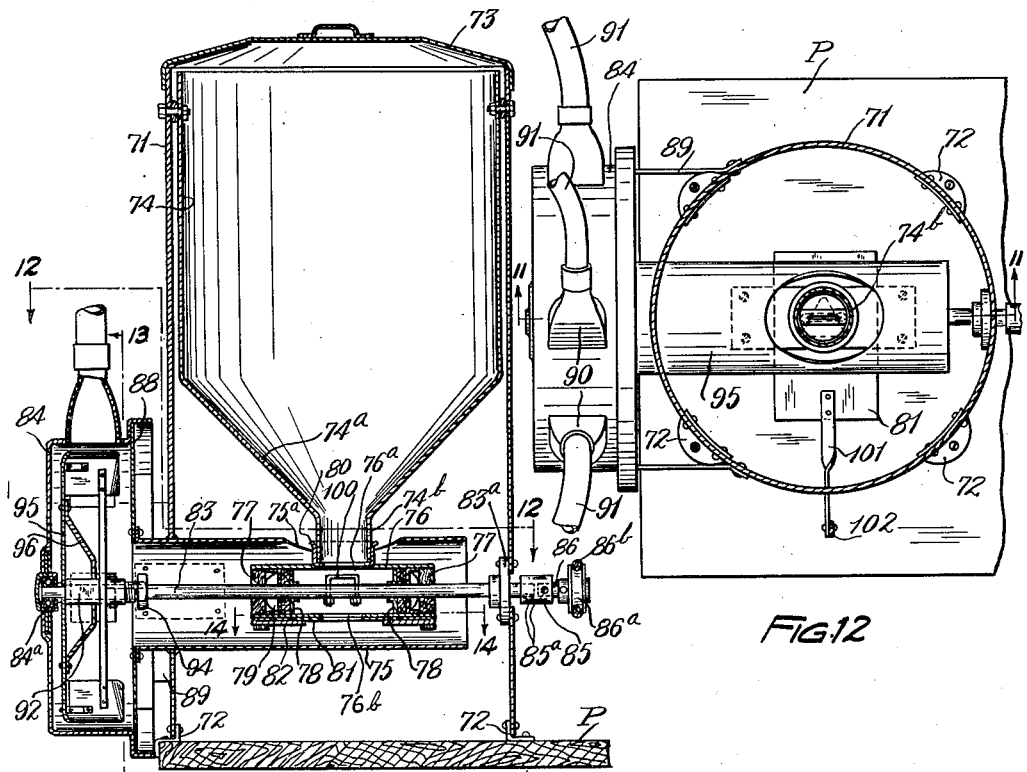
Fig. 11
Fig. 12
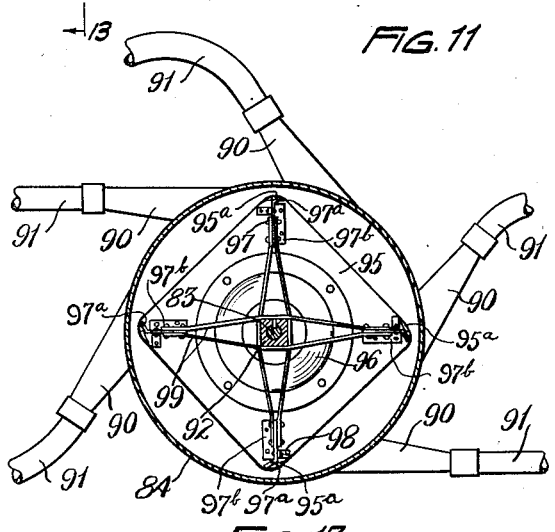
Fig. 13
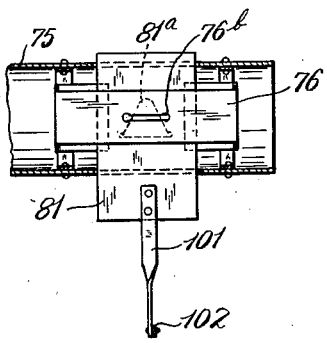
Fig. 14
INVENTOR.
RALPH R. ROOT
BY
Kwis, Hudson & Kent
ATTORNEYS.

Patented May 9, 1939

2,157,630

UNITED STATES PATENT OFFICE 2,157,630

DUSTING MACHINE

Ralph R. Root, Lakewood, Ohio

Application May 18, 1935, Serial No. 22,269

2 Claims. (Cl. 43—148)

This invention relates to improvements in dusting machines of the character employed to dispense powdered material such as insecticides upon growing plants as, for example, cotton or other plants which are arranged in rows although, of course, the machine is also adapted to be used for spraying powdered material upon trees and the like. The machine is intended for power operation and the complete unit can be mounted upon a suitable vehicle in order that it may be drawn over the ground during the dusting operation.

This application is a continuation in part of application Serial No. 629,344, filed August 18, 1932, which latter application is a division of application Serial No. 373,507, filed June 25, 1929, now Patent No. 1,964,176, issued June 26, 1934.

In a dusting machine of the character disclosed herein moving air is used as the medium for mixing and distributing the dust, and it is obvious that the more thorough the mixture, the more efficient the results. In efficient dusting it has been found that high air velocity is a prerequisite. Ordinarily high air velocity meant greatly increased power requirement, wherefore it has been necessary to operate dusting machines with large, heavy and expensive engines.

An object of the present invention is to provide a dusting machine wherein high air velocities are obtained by means of a relatively small power unit.

Another object is to provide a dusting machine which is so constructed that a small fan can do the work which ordinarily a fan many times its size would be required to do.

Another object is to provide a dusting machine of such character that the dust can be simultaneously ejected upon and accurately directed to a plurality of rows of growing plants.

Another object of the invention is the provision of a machine of this character, of simple construction, employing relatively few parts, capable of delivering a large quantity of air with a small power consumption.

Another object is the provision of novel means for storing the powder and insuring a constant supply in the feeder regardless of the quantity in the storage hopper.

Another object is the provision of a hopper shaking means, whereby the use of powder stirring mechanism is avoided.

Another object of the invention is the provision of a centrifugal fan housing with a plurality of exit connections whereby the quantity of air delivered for a given fan size and power consumption is greatly increased over the amount delivered from a single exit connection.

Another object is the provision of a plurality of outlets from the feeder bowl in combination with a fan housing having a plurality of exit connections, whereby the dust content of the various streams of air leaving the housing is substantially the same.

Another object of the invention is the provision of a novel whipper in the feeder bowl for maintaining an even flow of dust into the fan casing, and particularly a whipper so constructed as to free itself from any lint which may be contained in the powder.

Another object is the provision of a special holder for the bearing of the eccentric at the upper end of the hopper shaking shaft, whereby the bearing is protected from dust by an air pocket.

Another object is the provision of a special washer construction for sealing the bottom of the feeder bowl, while at the same time permitting a certain amount of vibration of the whipper shaft without undue friction.

Another object is the provision of means for regulating, simultaneously, the size of the various outlets from the feeder bowl.

Still another object is the provision of a fan of simple sheet metal construction nicely balanced and supplied with means for maintaining its path of movement free from an accumulation of dust on the walls of the casing.

A further object of the invention is to provide in a dusting machine a power transmission to the dust feeder and fan which is of such character that no clutches or gears are employed whereby the likelihood of mechanical troubles is eliminated.

A further object is to provide a dusting machine wherein the dust can be directed upon the plants from one or more nozzles, which nozzles can be adjusted to change their elevation according to the height of the plants being dusted.

A further object is to provide a dusting machine which is a unit that can be mounted upon various forms of carts or wagons.

Still another object is to provide in combination with a dusting machine a cart for the same, wherein the distance between its wheels is adjustable so that the wheels can be located between the rows of plants irrespective of the width of the spaces between the rows.

Other objects and features of novelty will appear as I proceed with the description of those embodiments of the invention which, for purposes of the present application, I have illustrated in the accompanying drawings in which Fig. 1 is an elevational view principally in section through the vertical axis of the machine showing one embodiment of the invention.

Fig. 6 is a plan view on a larger scale illustrating, partially in section, the fan and fan housing and the feeder bowl and whipper.

Fig. 7 is a vertical sectional view of the same.

Fig. 8 is a detail sectional view taken substantially on line 8—8 of Fig. 6.

Fig. 11 is a vertical transverse sectional view through the dusting machine unit shown in Fig. 9 and is taken substantially on line 11—11 of Fig. 12 looking in the direction of the arrows.

Fig. 12 is an irregular sectional view taken substantially on line 12—12 of Fig. 11 looking in the direction of the arrows, the fan housing being shown in top plan.

Fig. 13 is a vertical sectional view taken substantially on line 13—13 of Fig. 11 looking in the direction of the arrows, and Fig. 14 is a fragmentary horizontal sectional view taken substantially on line 14—14 of Fig. 11 looking in the direction of the arrows.

Figure 1:
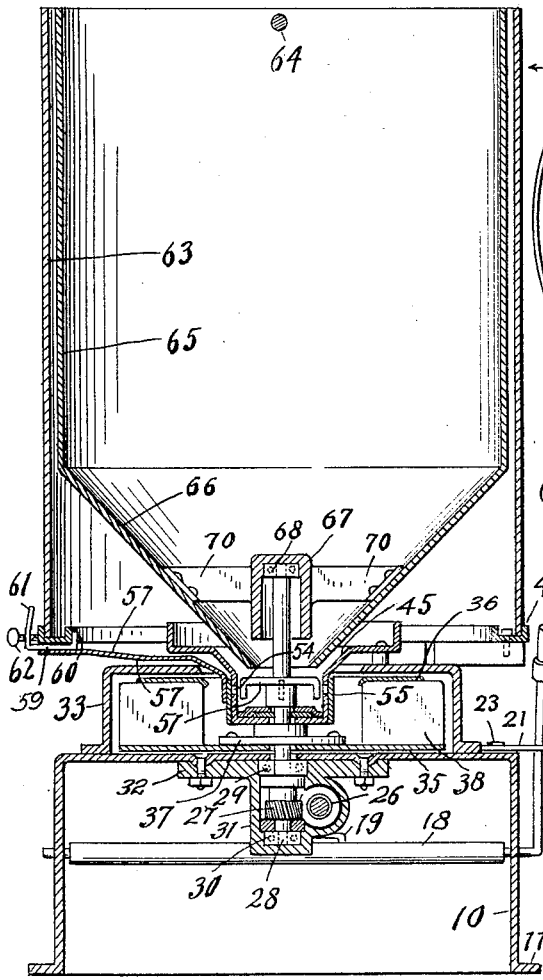
Figure 3:
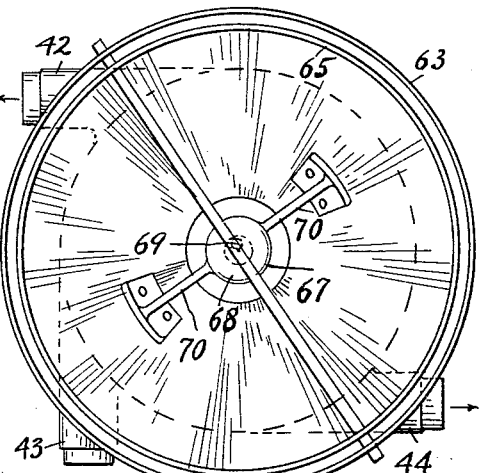
Fig. 3 is a top plan view with the hopper in place.
Figure 4:
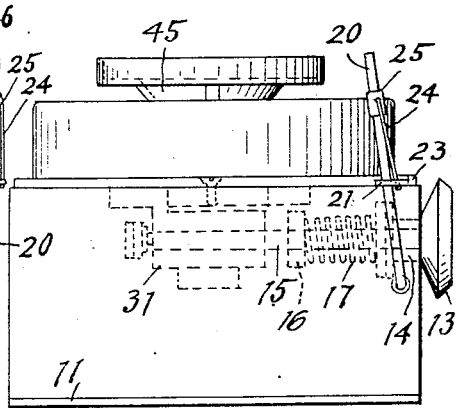
Fig. 4 is a side elevation with the hopper removed, this view being taken at right angles to that of Fig. 1.
Figure 2:
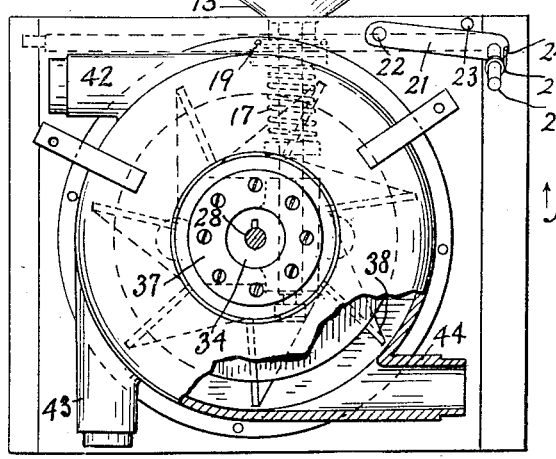
Fig. 2 is a plan view of the same with the hopper removed, certain parts being shown in section, and others broken away in order to more fully illustrate the invention.
Figure 5:
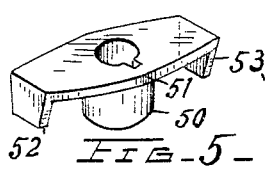
Fig. 5 is a perspective view of the whipper.

In the drawings in the embodiment shown in Figs. 1 to 8 inclusive the base of the machine is shown at 10. It is provided with a bottom flange 11 by means of which the machine is adapted to be bolted or otherwise fastened to a vehicle. Its arrangement upon the vehicle is such that it moves in the direction of the arrow A, Figs. 2 and 6, when the vehicle is traveling forward. Directly in front of the dusting machine an engine (not shown) is mounted. The engine crankshaft is provided on its rear end with a female clutch element 12, Fig. 2, adapted to be engaged by a cone clutch element 13 for the transmission of power to the dusting machine. The cone 13 is mounted upon a collar 14 which is keyed to slide upon a shaft 15. Surrounding the shaft 15 between the collar 14 and a collar 16 pinned to the shaft, is a coil spring 17 which tends to hold the clutch elements in engagement. A rock shaft 18 is pivotally mounted in the base 10 below and transversely to the shaft 15, and is provided with a projection 19 that is adapted to engage with the sliding collar 14. The shaft 18 is provided with a crank handle 20 by means of which the projection 19 may be caused to exert pressure in opposition to the spring 17, whereby the clutch is released. A latch 21 is pivoted at 22 upon the base 10 and is adapted to engage behind a stop 23. The free end of the latch 21 has a hole therein loosely surrounding the crank handle 20, and the outer end of the latch is connected by a wire 24 with a collar 25 slidable on the handle 20. When the cone element 13 is to be moved into engagement with the clutch element 12, the collar 25 is raised sufficiently to lift the outer end of the latch 21 above the stop 23, and the spring 17 is then permitted to act. Hence, the operator may operate the clutch control readily with one hand.

The shaft 15 is provided with a spiral gear 26 that meshes with a second spiral gear 27 secured to a vertical shaft 28. The latter is mounted in bearings 29 and 30 carried by a gear casing 31 which has a top flange 32 bolted to the top of the base 10, as indicated in Fig. 1. The shaft 28 extends upwardly through the top of the base and carries all of the rotating parts of the dusting machine.

On top of the base 10, concentric with the shaft 28, I mount a fan housing 33. The fan is composed of a cast metal hub 34 and two sheet metal stampings 35 and 36. The stamping 35 has a central portion secured to a flange 37 on the hub 34 by rivets or the like. The stamping 35 comprises fan blades 38 bent upwardly at intervals and provided with tabs 39 which extend through suitable slots in the ring stamping 36. The two stampings are secured together by bending over the tabs 39. The outer ends of the blades 38 have small projections 40 thereon, the projections on one blade being offset slightly from those on the next blade. These projections clear the housing 33 by a small margin only, and because of their staggered relation on the several blades they cover together the full height of the housing and serve to keep the latter free from dust while causing much less friction than would be occasioned were the blades themselves extended to practically engage the housing wall. The hub 34 is keyed to the shaft 28, as indicated at 41 in Fig. 7.

The housing 33 at spaced points is provided with tangentially arranged exit connections 42, 43 and 44 for air and dust mixture, the connections 42 and 44 extending transversely in opposite directions and the connection 43 extending rearwardly. These connections are adapted to receive delivery pipes, not shown, which are directed downwardly toward the ground in spaced relation across the path of the vehicle.

Upon the housing 33 I support concentrically a feeder bowl 45 and a channel ring 46, the bowl 45 extending downwardly into the center of the fan housing through a relatively large opening in its top. The bottom of the bowl 45 has a hole 47 therethrough, of a diameter considerably larger than the diameter of the shaft 28. Rotatably mounted upon the shaft 28, just above the bottom of the bowl 45, is a washer 48 having a triangular outer edge. The washer 48 is prevented from rotating and from being dislodged upwardly by a triangular retaining plate 49 which is attached at its corners to the bowl 45. Hence the washer 48 is effective to prevent leakage of dust downwardly through the opening 47, and is free to move laterally, to a small extent, in response to the vibration or out of center movements of the shaft 28. Within the cylindrical lower portion of the bowl 45 the shaft has keyed thereto the hub 50 of a whipper 51, comprising a horizontal plate and two downturned lips 52 and 53, both of which taper towards the bottom. The forward edge of the lip 52 is beveled on its outer side, while the forward edge of lip 53 is beveled on its inner side. The beveled forward edge of the lip 52, upon rotation of the whipper, serves to force the powder outwardly, while the beveled forward edge of the lip 53 acts as a knife to cut back the powder and maintain a free path for the rotation of the whipper. Lint, which is frequently present in the powder to be dispensed, is dislodged from the lips, not only by the action of gravity, but also because of the downwardly tapered edge surfaces of the whipper.

The cylindrical wall of the bowl 45 is provided at a plurality of points with slots 54 through which the powder is to be delivered. I have determined by experiment that two slots, positioned as indicated in Fig. 6, are adapted to satisfactorily distribute powder to the three outlet connections 42, 43 and 44 positioned as indicated in that figure. The number and position of the slots 54 is of considerable importance, and must be determined by experiment when the number or position of the outlet connections of the housing is changed. While a greater number of slots may be employed in connection with the design herein illustrated, it is not possible to effect an even distribution of powder with a single slot, when the outlet connections are arranged as shown.

In order to control the speed of delivery of dust, I mount a valve ring 55 to turn upon the bowl 45 through a limited angle. This mounting may be effected by a pin 55a and slot 55b connection, as illustrated in Fig. 7. The ring 55 has slots 56 therein adapted to uncover more or less of the slots 54, depending upon the position of adjustment of the ring. Attached to the ring 55 is a radial arm 57. At its outer end the blank for this arm is provided with a laterally extending portion 58 that is bent up and over to form a loop, as shown in Fig. 8. Within this loop there is mounted a radially extending slide 59 provided with an upturned rear end 60 to engage behind the ring 46 and an upwardly turned front end 61 extended to form a pointer. The end 61 is provided with a threaded opening in which is mounted a clamping screw 62, adapted to bear at its inner end against the ring 46. When the screw 62 is loosened the arm 57 may be swung to effect the adjustment of valve ring 55, and when the desired adjustment is obtained the screw 62 is threaded inwardly to hold the parts in that position.

Supported upon the ring 46 is an outer cylindrical shell 63. This shell may have painted thereon indicia to indicate the degree of opening of the slots 54 for the various adjustments of the pointer. Near its upper end the shell 63 carries a pivot rod 64. The hopper in which the powder is stored comprises an inner shell 65 pivotally mounted upon the rod 64 and a bowl 66 that is tapered sufficiently to enable the hopper to extend into the tapered upper portion of the feeder bowl 45, the lower end of the hopper being open as shown in Fig. 1. 67 is an inverted cup-shaped support for a ball bearing 68 that surrounds the eccentric upper end 69 of the shaft 28 (see Fig. 3). The support 67 is mounted upon sheet metal arms 70 which are riveted at their outer ends to the bowl 66 of the hopper. The arms 70 are arranged at right angles to the pivot rod 64, so that they are adapted to deliver to the hopper vibrations caused by the eccentric movement transverse to the pivot rod 64. In this manner the hopper is swung back and forth rapidly upon its pivot. The eccentric movement, of course, tends to move the center of the lower end of the hopper in a small circle, but this movement, except along the direction of the arms 70, is largely absorbed by the arms, owing to their resilient sheet metal construction.

On account of the deep-cup shape of the support 67, the air which is entrapped within the support, when the hopper is filled, prevents the powder from rising within the support, and thus keeps it away from the bearing 68. Practically the entire weight of the stored powder is carried by the hopper. When the hopper is filled a small arch of powder forms at the lower end above the discharge opening. Hence there is very little weight of powder upon the whipper 51, and the rotation of the latter requires very little power. The constant shaking of the hopper, however, keeps the supply of powder in the feeder bowl 45 constant, so that the rate of discharge from the bowl 45 is not affected by the amount of powder in the hopper.

The operation of the machine shown in Figs. 1 to 8 inclusive will be more or less obvious from the above description of its construction. When the clutch element 13 is permitted to engage the clutch element 12, the shaft 26 rotates and drives the vertical shaft 28, the gearing being preferably such that the speed of rotation of shaft 28 is somewhat above that of shaft 26. The hopper 65, 66 is thereby caused to swing rapidly back and forth upon its pivot rod 64, shaking powder downwardly as rapidly as it is delivered from the machine. The whipper 51 beats the powder in the feeder bowl 45 so that the suction of the fan readily draws it through the slots 54 and 56 into the fan housing. Air enters the housing through the central opening in the top thereof around the sides of the feeder bowl 45, and is mixed with the dust as the fan rotates. The mixture is forced outward rapidly by centrifugal action through the connections 42, 43 and 44, and thence through suitable pipe connections to the desired point of delivery.

Reference will now be made to the embodiment of the invention shown in Figs. 9 to 14 inclusive. The dusting machine shown in said figures is mounted upon a platform P which can be mounted as a unit upon a cart C, as clearly shown in Fig. 9, said platform P being bolted or otherwise secured to the cart. The unit comprises a cylindrical casing 71, see Fig. 11, secured at its lower end to angle irons 72 carried by the platform P. The upper end of the casing 71 is closed by a removable cover 73. A container or magazine 74 for the powder or dust is arranged within the casing 71 and is secured thereto by means of suitable bolts and spacer blocks, as clearly shown in Fig. 11, the walls of the container or magazine being spaced slightly from the walls of the casing. The lower end of the container or magazine 74 is of conical shape, as indicated at 74a. and is provided with a centrally disposed downwardly extending cylindrical extension 74b. The extension 74b projects through an opening 75a located in the upper side of a tubular member 75 which extends horizontally of the casing 71 and is supported by the wall of said casing and projects outwardly thereof and forms a conduit for a purpose later to be explained.

A feeder bowl is supported centrally of the tubular member 75 beneath the opening 75a and comprises a substantially rectangular and tubular element 76, the opposite ends of which are closed by wooden blocks 77 which form bearings for a shaft later to be referred to. Inwardly of the blocks 77 are partitions 78, while between said partitions and the blocks 77 are spacer members 79, spaced from the partitions 78, the space between the partitions 78 and the members 79 being filled with a suitable packing, while the spaces between the members 79 and the blocks 77 are filled with a suitable lubricant. The upper side of the tubular element 76 is provided with an opening 76a, aligned with the extension 74b of the magazine, while a cup 80 is secured to the upper side of the element above the opening 76a and has a similar opening in its bottom wall registering with the opening 76a, it being noted by reference to Fig. 11 that the extension 74b fits within the cup 80.

The bottom wall of the element 76 is provided with an elongated narrow slot 76b, with which cooperates a triangular opening 81a located in a plate 81 which is slidably supported in a supporting plate 82 secured to the bottom side of the element 76, and having its ends reversely bent so that the portion of the supporting plate upon which the plate 81 slides is spaced from the bottom of the element 76 as clearly shown in Fig. 11. The opposite ends of the plate 81 pass through slots formed in the tubular member 75, as clearly shown in Fig. 14. A shaft 83 is arranged centrally of the tubular member 75 and passes through openings in the wooden blocks 77, partitions 78 and spacer members 79 carried by the element 76, said shaft adjacent one end extending through a suitable bearing 83a carried by the casing 71 and outwardly through an opening in the casing, while its opposite end extends beyond the tubular member 75 and into a fan housing 84 where it is supported in a suitable bearing 84a carried in the outer wall of the fan housing, as clearly shown in Fig. 11. The end of the shaft which extends outwardly of the casing through the bearing 83a is provided with a key-way receiving a key carried by a sleeve 85, which can be locked to the shaft by means of a set screw 85a, and which also has secured therein a shaft 86 carrying a pulley 86a which is driven by a belt 86b that extends around the pulley 86a and around a pulley (not shown) on the shaft of a motor 87, indicated in Fig. 9.

The fan housing 84 is in the form of a drum having at its open end which is adjacent to the casing 71 an enlarged portion forming an annular shoulder to which is secured a plate 88 provided with a central opening, the periphery of which lies against and is secured to an annular flange provided on the outer end of the tubular member 75, as clearly shown in Fig. 11. Suitable bracing members 89 extend between the casing 71 and the enlarged part of the fan housing 84 and at their opposite ends are secured, respectively, to the casing 71 and the wall of the enlarged portion of the fan housing. The periphery of the fan housing is provided with a plurality of circumferentially spaced substantially tangentially extending outlet funnels 90 which communicate with the interior of the fan housing and are adapted to have secured to their outer ends by suitable clamping means the inner ends of flexible conduits 91, it being noted that although five of the outlet funnels 90 are shown in the present embodiment, said number can be varied, if desired, and in some instances a dusting machine embodying the present invention would use fan housings having varying numbers of outlets from one upward, which could be readily substituted for the fan housing shown in the drawing in order to accommodate the machine for the performance of different kinds of dusting operations.

A fan hub 92 is secured on the end of the shaft 83 within the fan housing 84 by means of providing the hub with a reduced threaded end which is longitudinally slotted so that a key carried by the shaft 83 can extend into the slot and when a clamping nut 94 is screwed upon the reduced threaded end of the hub said end will be brought into tight holding engagement with the key on the shaft, wherefore the hub and shaft will rotate as a unit. A plate 95 is secured to the end of the hub and has a centrally arranged conical member 96 secured to its inner side which member in turn is provided with a centrally located square opening fitting the hub 92, see Figs. 11 and 13. Each corner of the plate 95 is turned inwardly, as indicated at 95a, and abuts an angularly disposed portion 97a of a fan blade 97 which has a flanged end 97b secured to the plate 95. On the side of each blade 97 opposite to the side carrying the flange 97b is a downwardly extending reenforcing brace 98 secured to the fan blade and to the plate 95. The fan blades 97 are shown as four in number and are arranged in diagonally opposed pairs, it being noted that pairs of reenforcing strips 99 have their opposite ends secured to the blades of the diagonally opposed pairs of blades, and that said strips tightly embrace the square or rectangular portion of the hub 92. The fan construction just described is such that although it can be economically made of sheet metal, it is so constructed, reenforced and braced as to have great strength, and therefore is capable of being rotated at high speeds to produce high air velocities.

Within the tubular element 76 or feeder bowl a U-shaped member 100 which can be formed of heavy wire has its ends extending through and secured in suitable openings in the shaft 83 and acts as a stirrer to agitate the dust passing from the magazine into the feeder bowl and thus prevents caking of the dust and causes the same to flow outwardly through the opening slot 76b in a powdered condition. The plate 81 has secured thereto an arm 101 which extends through an opening in the casing 71 and has connected to its outer end a lever 102 pivotally mounted intermediate its ends on a bracket 103 carried by the casing 71 and extending upwardly alongside of the casing so that the upper end of the lever is within convenient range of the operator. It will be seen that the lever 102 can be swung to effect a movement of the plate 81, and since the plate 81 is provided with a triangular opening 81a which underlies the slot 76b, the effective size of the slot 76b can be regulated by the movement of the plate with a resultant control of the volume of dust which passes from the feeder bowl into the tubular member 75 that forms the conduit to the fan housing 84. A bracket 104 is secured to the casing 71 adjacent the upper end of the lever 102 and is provided with a plurality of openings into which pins can be positioned so as to adjustably hold the lever 102 in various positions according to the effective size of the slot 76b desired in the particular operation of the machine, that is, the volume of dust that is desired to disperse from the machine upon the plants being dusted.

It will be noted that in the dusting machine of the embodiment shown in Figs. 9 and 11 to 14 inclusive the fan is driven from the motor 87 by means of a simple straight shaft driving connection and that it is not necessary to employ gearing, clutches or similar transmission elements which complicate the machine, increase the expense thereof and render more likely the danger of mechanical troubles. It will be understood that when dust is placed in the magazine 74 said dust will pass downwardly of the magazine, through the conical portion 74a and thence through the cylindrical extension 74b into the tubular element or mixer bowl 76, wherein it will be agitated by the U-shaped member 100 so that it will pass in finely divided form through the slot 76b and into the tubular member 75 from where it will mix with the air drawn through the tube by the rapidly rotating fan and pass into the fan housing and be discharged tangentially therefrom through the funnels 90. The present construction is such that a relatively small motor can be employed and said motor will impact high speed rotation to the fan, which fan due to its particular construction creates, during its high speed rotation, high air velocities and since the fan housing is provided with a plurality of tangential outlets the relatively small fan operates with an efficiency ordinarily only found in fans of much larger size.

In actual practice it has been found that the single fan housing with the multiple tangential outlets, together with the fan construction and the drive thereto from the motor, produces air velocities of 150 miles and over per hour, with the result that such air velocities break the dust into fine particles, overcome light winds and permit successful dusting under comparatively unfavorable atmospheric conditions. If desired a stirrer can be provided for the container or magazine 74, but due to the fact that said magazine contains no sharp corners in which the dust can collect and cake, the use of a stirrer is not absolutely essential.

Figure 9:
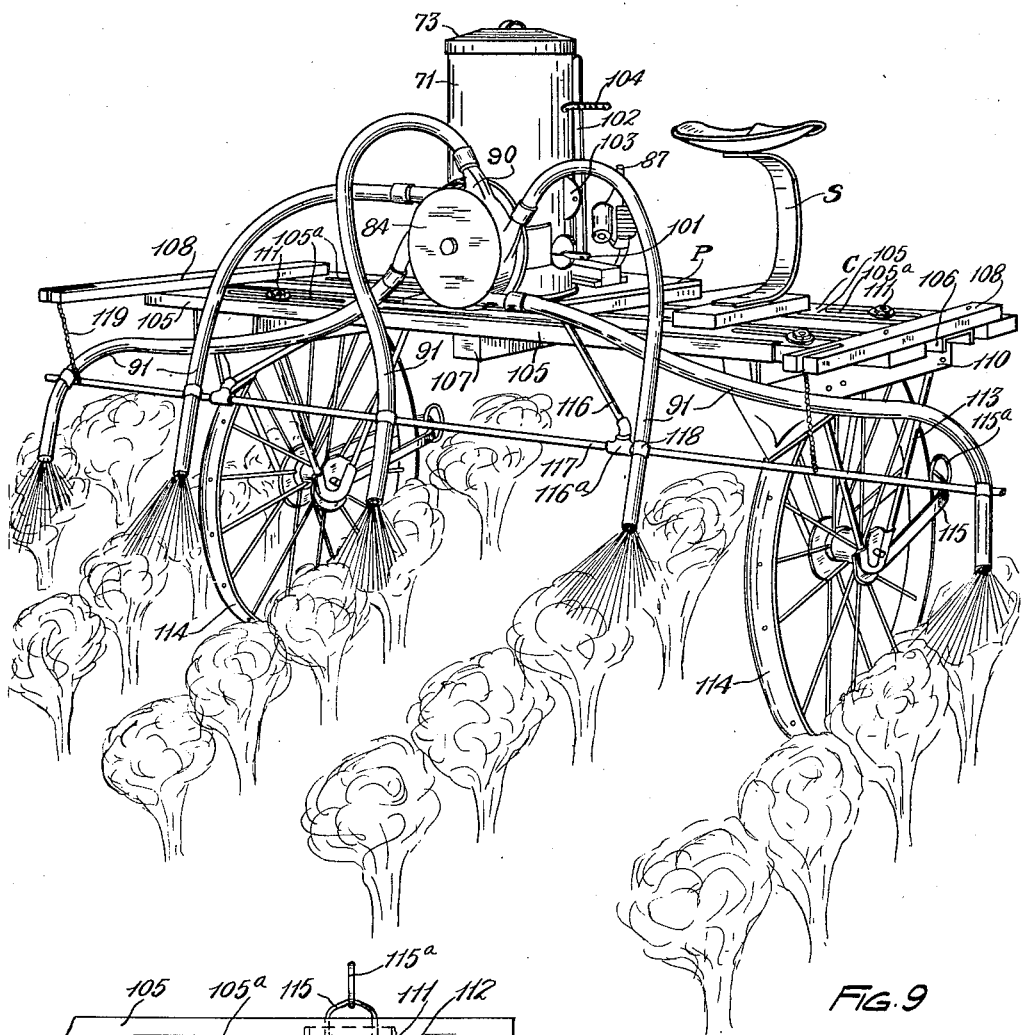
Fig. 9 is a perspective view of another embodiment of the invention, wherein the dusting unit is shown mounted upon a cart having special utility in connection therewith and wherein the cart is shown as having its wheels arranged between rows of plants which the dusting machine is dusting.
Figure 10:
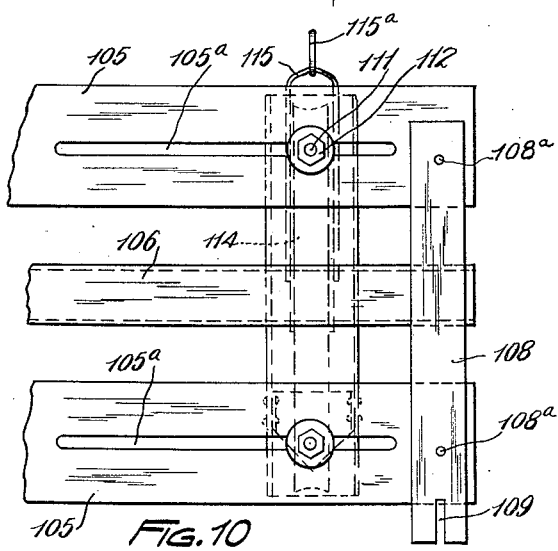
Fig. 10 is a fragmentary top plan view of an end portion of the platform of the cart shown in Fig. 9.

As previously stated, the dusting machine and the motor or engine 87 are mounted upon a platform P and form therewith a unit, which can be secured to any form of suitable cart. However, it is proposed to mount such unit upon a particular form of cart which is so constructed as to definitely cooperate with the dusting machine unit to enable the latter to more efficiently perform the dusting operations. The cart referred to is shown in Figs. 9 and 10, and comprises a frame formed of suitable wooden or other members 105 extending the full width of the cart, while a downwardly facing metal channel 106 is arranged between the members 105 and also extends the full width of the cart. The members 105 and the channel 106 are connected and reenforced intermediate their ends by a beam 107, extending transversely thereto and secured to the underside thereof, while adjacent the opposite ends of the cart the members 105 and the channel 106 are interconnected and made into a frame unit by reenforcing members 108 secured to the upper sides of the members 105 and channel 106 but projecting outwardly beyond the rear end of the cart and provided at their rear ends with a slot 109 for a purpose later to be explained.

Adjacent each end of the cart and beneath the frame there is provided a wheel mounting 110 formed of structural metal members which are secured to the platform by means of bolts 111 extending through elongated slots 105a formed in the members 105, suitable clamping nuts and washers 112 being arranged on the bolts to clamp the wheel mountings in various positions of adjustment with respect to the transverse width of the cart, wherefore the distance between the wheels of the cart can be varied in accordance with the spacing of the rows of plants being dusted. The wheel mountings carry downwardly extending V-shaped metal frames 113 which support the axles of the wheels 114 and carry forwardly extending U-shaped members 115 which are provided at their forward ends with hitching rings 115a to which can be attached the motive power for the wagon, as, for example, a horse or horses.

An adjustable support for the ends of the conduits 91 is carried by the cart and comprises divergent supporting arms 116 extending rearwardly and downwardly from the rear edge of the cart and rockably supported by the platform, said arms 116 being formed in the present instance of tubular piping and having suitable fittings 116a at their outer ends through which extends a rod 117 upon which the conduits 91 rest and are secured thereto by means of clips 118. Chains 119 are secured to the rod 117 and extend upwardly through the slots 109 in the members 108 and are detachably connected to pins 108a carried by the members 108. It will be seen that the chains 119 can be varied as to length with a resultant variation in the position of the rod 117, wherefore the elevation of the outer ends of the flexible conduits 91 can be varied in accordance with the height of the plants being dusted.

A suitable seat S is mounted on the cart for the operator. A dusting machine such as has been described in connection with Figs. 9 to 14 inclusive is suitable for any type of crop, or a two wheel cart can be used, and it will be noted that the wheel spread of the cart can be adjusted to suit the spaces between the plant rows, while the range of adjustment in the elevation of the outer ends of the flexible conduits permits efficient dusting of plants of any size. Also, the flexible conduits permit the directing of the dust in any desired direction.

As previously explained, all the outlets for the dust will form a single fan housing which allows a small fan to be used which will do the work of a much larger one. Also, as has been explained, all power transmission to the dust feeder and fan is through a single straight shaft with no clutch or gears, and thus the most common cause of mechanical trouble is eliminated.

Although several preferred embodiments of the invention have been illustrated and described herein, it should be understood that the invention is susceptible of various modifications and adaptations within the scope of the appended claims.

Having thus described my invention I claim:

1. A dusting machine comprising a container for the dust, a fan housing, a tubular member secured to said fan housing and communicating therewith centrally thereof, dust feeding means arranged within said tubular member and in communication with said container and including a tubular element closed at its opposite ends by means of bearing blocks, a shaft passing through said tubular member into said fan housing and through said tubular element and the bearing blocks closing the ends thereof, means for rotating said shaft, and a fan mounted on said shaft within said housing to rotate therewith said housing being provided with an exit opening.

2. A dusting machine comprising a container for the dust, a fan housing, a tubular member secured to said fan housing and communicating therewith centrally thereof, dust mixing means arranged in said tubular member and in communication with said container and including a tubular element closed at its opposite ends and provided at its side with an opening, means for regulating the size of said opening, a shaft extending through said tubular member and said tubular element into said fan housing, means for rotating said shaft, and a fan mounted on said shaft to rotate therewith within said housing, said housing being provided with an exit opening.

RALPH R. ROOT.